United States Patent Office 3,143,504
Patented Aug. 4, 1964

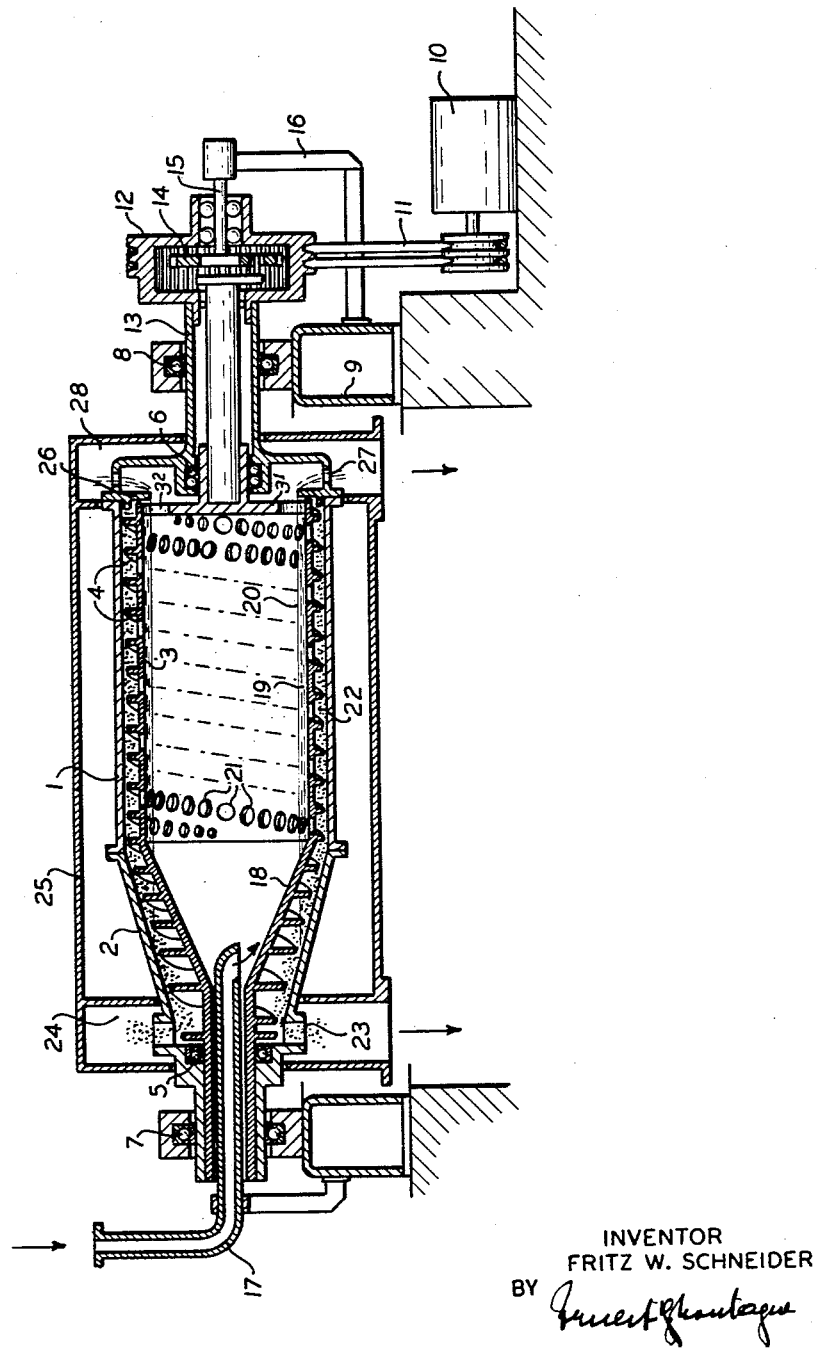

3,143,504
SOLID-BOWL CENTRIFUGE WITH
DISCHARGE SCREW
Fritz W. Schneider, Dortmund, Germany, assignor to
Krupp-Dolberg Gesellschaft mit beschränkter Haftung,
Essen, Germany, a corporation of Germany
Filed Dec. 28, 1960, Ser. No. 79,037
Claims priority, application Germany Jan. 5, 1960
2 Claims. (Cl. 233—7)

The present invention relates to solid-bowl centrifuges with discharge screws.

Solid-bowl centrifuges with discharge screws are used for the continuous separation of slowly settling solid particles from a carrier liquid. Such centrifuges, which are also known as screw centrifuges or decanters, consist essentially of a tapered or cylindrical solid-walled drum and a discharge screw mounted therein.

The mixture of solids and liquid to be separated is usually fed into the drum through the hollow screw shaft. The specifically heavier solid particles settle on the drum wall under the influence of the centrifugal force exerted thereto and are then conveyed, by means of the screw which is rotating at a predetermined differential speed in relation to the speed of the solid-walled drum, to discharge ports disposed above the level of the liquid, from which ports they are dropped into the solid-collecting chamber. The specifically lighter fluid flows in countercurrent to the movement of the solids through the screw helix over weir outlets, the settling of which determines the level of the liquid in the drum, into the liquid-collecting chamber.

As a rule, it is the aim to obtain waste-water which is as clear as possible, to free the solid from the water to a large extent and to dry it.

The first requirement is becoming ever more important, because in the course of the mechanical preparation of minerals, ever finer materials are being produced and have to be processed. A similar tendency, to process ever smaller particles, is also observed in the chemical industry and in sewage treatment.

The smaller the particle size and the closer the difference between the specific weights of the solid and of the liquid, the more difficult it is to separate them, because then even with high centrifugal accelerations, the sinking speeds are still very slow and raising them by a further increase in the speed of rotation is limited by reasons of strength considerations.

Solid particles which have still not been separated from the liquid after flowing through the drum are discharged in the waste water. The degree of separation is the poorer, the more solids pass into the liquid discharge.

Theoretical considerations have shown that the degree of separation would be improved, if the drum were built longer; alternatively, if a long drum were used, a greater quantity of material could be processed than when using a short drum in order to obtain the same degree of separation.

In practice, however, the length of the drum is also limited for constructional reasons. In addition, experience has shown that in screw centrifuges of the conventional type, an extension of the solid-walled drum beyond a certain extent no longer improves the degree of separation or only does so to an insignificant extent. This is due to an undesirable secondary effect of the discharge screw. As a result of the screw rotating at relative speed in the liquid, additional currents are produced there which again stir up solid particles which have already settled or hold them in suspension so that they finally pass into the waste water.

In screw centrifuges of the conventional type, therefore, the degree of separation is relatively poor, and the processing of fine substances is impossible in many instances, if a clear waste water or a satisfactory degree of separation is to be achieved.

Various attempts have been made to improve the separation. Thus, screw centrifuges are known, the drums of which comprise laminated and auxiliary screw inserts in order to encourage the settling of the solid particles. Such installations, however, necessitate considerable expenditure on construction. The maximum speed of rotation of such machines is lower than in the normal type, for reasons of strength, because the centrifugal forces exerted by the inserts also have to be taken up by the supporting structure. The advantage of these inserts is therefore largely cancelled out. In addition, such centrifuges are unsuitable for the processing of materials which adhere and cake, because the narrow gaps of the inserts are easily obstructed and incrusted.

An attempt has been made, in other screw centrifuges, to obtain an improved separation of the solids by means of a predetermined direction of the flow in the drum.

All such known centrifuges, however, have in common the fact that the undesirable secondary effect of the discharge screw, as set forth above, is not avoided and the degree of separation is therefore not improved or only to an insignificant extent, because the settling and the conveying of the material take place in one and the same compartment.

A so-called sludge centrifuge is also known having a double-cone solid-walled drum and discharge of the separated solids through nozzles at the outermost circumference of the drum, the sludge compartment being screened off from the settling chamber by a screening jacket rotating with the conveyor screw and plate inserts. It is true that by this means the secondary effects of the screw which affects the degree of separation are avoided on the settling chamber provided with plate inserts. Nevertheless, the construction of relatively high left-hand and right-hand screw helices which are therefore working in opposition to one another and moving the solids to the largest diameter of the solid-walled drum, leads to the fact that, in the region of the sludge discharge, powerful inwardly directed streams of liquid are produced which again stir up the solid particles which have already settled and entrain them into the settling chamber. Thus, agitation of the solids is, in fact, not avoided, but produced in a disadvantageous manner. Moreover, the comparatively small apertures in the screening jacket and the plate inserts tend to become blocked in a similar manner to that described above. A further disadvantage of this centrifuge resides in the fact that a considerable proportion of liquid is discharged together with the solids.

It is, therefore, one object of the present invention to provide a solid-bowl centrifuge with discharge screw, which overcomes the disadvantages in the known centrifuges which have been outlined above, particularly the secondary effects of the conveyor screw which adversely affect the degree of separation, and so to provide a screw centrifuge, the degree of separation of which approaches the theoretical optimum as closely as possible.

It is another object of the present invention to provide a solid-bowl centrifuge with discharge screw, wherein the settling chamber and the conveying chamber are of cylindrical shape and both chambers are separated from one another in a known manner by means of the cylindrical screw drum which is provided with perforations for the separated solids within the range of the settling chamber, the settling chamber, at one end of which terminates the inlet pipe and at the opposite end of which the clarified liquid runs off over an annular weir, being bounded by the self-adjusting level of the liquid and by the screw drum, while the conveying chamber surrounding it is bounded by the screw drum and the cylindrical solid-walled drum.

It is still another object of the present invention, to provide a solid-bowl centrifuge with discharge screws, wherein the material supplied through the inlet pipe arrives first on a tapered accelerating funnel which is connected so as to blend smoothly into the cylindrical screw drum and half the angle of opening of which amounts to about 25°, the discharge screw helix being mounted on the outside of said funnel, and the inlet pipe extends through a hollow cylindrical portion preceding the tapered accelerating funnel, and the outer diameter of said inlet pipe is slightly smaller than the inner diameter of the hollow cylindrical portion.

The length of the settling chamber is preferably at least twice and the height of the conveying chamber within the range of the settling chamber about 4 percent of the internal diameter of the drum, while the settling chamber is free of inserts and the tapered extension of the solid-walled drum, seen in the direction of discharge of the solids, starts behind the accelerating cone of the screw drum.

In the screw centrifuge constructed in accordance with the present invention, the effect is obtained that the mixture of liquid and solids to be separated is supplied to the settling section in a manner which is favorable to the flow and uniformly over the whole diameter of the drum, whereby the stirring-up action of the conveyor screw does not extend into the settling chamber, and as a result of appropriate dimensioning and shaping of the conveyor chamber no disturbing currents occur and the clarifying surface which determines the through-put quantity is fully utilized. Thus the problem posed is solved with simple means.

With these and other objects in view which will become apparent in the following detailed description, the present invention will be clearly understood in connection with the accompanying drawing, in which the only figure is an axial section of the centrifuge.

Referring now to the drawing, the screw drum 3 rotates inside the cylindrical solid-walled drum 1, which rotates at high speed and which is provided with a tapered extension 2, the screw drum 3 having a predetermined differential speed, and the wall of the screw drum 3 being provided with perforations 21 and equipped on its outside with screw helices 4.

The screw drum 3 is mounted by means of ball and roller bearings 5 and 6 in the solid-walled drum 1 which, in turn, is supported, by means of the ball and roller bearings 7 and 8, on the foundation frame 9. The solid-walled drum 1 is driven by the motor 10 over V-belts 11, the gear-box 12 and the hollow shaft 13. The differential speed of the screw drum 3, required for the discharge of the solids and which amounts to about 1% of the rotor speed, is produced in known manner by means of the rolling gear drive 14, the three shaft ends 15 of which are held by a torque lock 16.

The material to be centrifuged is fed continuously into the tapered portion 18 of the screw drum 3 by means of the inlet pipe 17, accelerated to peripheral speed by the friction between the material and the cone and equally distributed over the total diameter of the drum. The inner end of inlet pipe 17 is turned toward the inner face of the tapered portion 18 of the screw drum 3 in order to feed the material toward the inner face of the tapered portion. Then the material passes into the inner chamber of the cylindrical screw drum 3, the so-called settling chamber 19, which is bounded on the one hand by the level 20 of the liquid and on the other hand by the screw drum 3. The specifically heavier solid particles settle through the apertures 21, extending over the entire settling range, into the conveyor chamber 22, which is bounded by the cylindrical portions of the solid-walled drum 1 and by the screw drum 3, and are caught there by the screw helices 4 and conveyed to the discharge outlets 23. The solids disposed in the tapered extension 2 are lifted on the way to these outlets above the level of the liquid and arrive, thereby, in the solid-collecting chamber 24 of the housing 25 freed of water.

The specifically lighter liquid flows slowly and undisturbed through the settling chamber 19 and emerges from the latter finally clarified over the annular weir 26, whence it passes through apertures 27 into the liquid-collecting chamber 28 of the housing 25.

The screw drum 3 has at its end opposite its conically reduced portion 18 an end wall 3' which has an opening $3^2$ near its outer periphery through which opening $3^2$ the finally clarified liquid flows directly over the annular weir 26.

In another embodiment of the present invention, the screw drum 3 may also be constructed in the form of a cage- or web-drum (not shown).

While I have disclosed one embodiment of the present invention, it is to be understood that this embodiment is given by example only and not in a limiting sense, the scope of the present invention being determined by the objects and the claims.

I claim:

1. In a solid bowl centrifuge,
  a screw drum mounted for rotation about its longitudinal axis and having a helical screw extending about its outer face throughout its entire length for the continuous separation of slowly settling particles from a carrier liquid,
  a housing,
  a solid-walled drum being rotatably mounted in said housing,
  said solid-walled drum including a hollow cylindrical portion and a continuing conically reduced portion,
  said screw drum being disposed coaxially to and within said solid-walled drum and including a first hollow cylindrical portion of larger diameter, a continuing conically reduced portion and a further continuing second hollow cylindrical portion of smaller diameter,
  said screw drum having an end wall at the free end of said first cylindrical portion of larger diameter,
  said end wall having an opening at its outer periphery,
  said first cylindrical portion of said screw drum having a plurality of perforations,
  an inlet pipe for the goods to be centrifuged extending through said second cylindrical portion and extending into and terminating at the narrow end of said conically reduced portion of said screw drum,
  the outer diameter of said inlet pipe being substantially identical with the inner diameter of said second cylindrical portion, in order to prevent an escape of the goods to be centrifuged from said screw drum along said inlet pipe,
  the inner end of said inlet pipe being turned toward the inner face of said conical portion of said screw drum, in order to feed the goods to be centrifuged toward the inner face of said conical portion and ensure the travel of the goods along the inner face of said conical portion to said first cylindrical portion of said screw drum,
  said conically reduced portion of said screw drum receiving at its inner face of smaller diameter said goods to be centrifuged and accelerating said goods during their travel toward said cylindrical portion of said screw drum,
  an annular weir disposed outside of and adjacent to said end wall,
  the lead-off edge of said weir having a diameter, the value of which extends between the values of the inner diameters of said screw drum at the reduced end of said conically reduced portion and of said first cylindrical portion, so that the liquid is removed from said screw drum through said opening of said end wall in an axial direction opposite to that of removal of said solid particles.

2. The solid bowl centrifuge, as set forth in claim 1, wherein
    said conically reduced portion of said solid-walled drum starts at its narrow end behind the narrow end of said conically reduced portion of said screw drum, seen in the direction of discharge of said solid particles.

References Cited in the file of this patent

UNITED STATES PATENTS

| | | |
|---|---|---|
| 2,573,585 | McBean | Oct. 30, 1951 |
| 2,600,372 | Milliken et al. | June 10, 1952 |
| 2,622,794 | Smith | Dec. 23, 1952 |
| 2,766,930 | Schmiedel | Oct. 16, 1956 |
| 2,862,658 | Dahlgren | Dec. 2, 1958 |
| 2,905,379 | Sticker | Sept. 22, 1959 |

FOREIGN PATENTS

| | | |
|---|---|---|
| 708,590 | Great Britain | May 5, 1954 |

OTHER REFERENCES

German printed application 1,020,575, December 5, 1957 (corresponding to U.S. Patent No. 2,905,379).